(12) United States Patent
Zimmerer et al.

(10) Patent No.: US 9,093,826 B2
(45) Date of Patent: Jul. 28, 2015

(54) ELECTRICAL SWITCHGEAR, IN PARTICULAR MEDIUM VOLTAGE SWITCHGEAR

(75) Inventors: Rudolf Zimmerer, Wald (DE); Manuel Osterrieter, Munich (DE)

(73) Assignee: SCHNEIDER ELECTRIC SACHSENWERK GMBH, Regensburg (DE)

( * ) Notice: Subject to any disclaimer, the term of this patent is extended or adjusted under 35 U.S.C. 154(b) by 428 days.

(21) Appl. No.: 13/399,060

(22) Filed: Feb. 17, 2012

(65) Prior Publication Data
US 2012/0212881 A1    Aug. 23, 2012

(30) Foreign Application Priority Data
Feb. 18, 2011   (DE) .......................... 10 2011 004 426

(51) Int. Cl.
| | |
|---|---|
| H02B 1/015 | (2006.01) |
| B32B 3/24 | (2006.01) |
| B32B 3/04 | (2006.01) |
| B32B 3/02 | (2006.01) |
| H02B 1/30 | (2006.01) |

(52) U.S. Cl.
CPC .............. H02B 1/305 (2013.01); *Y10T 428/16* (2015.01); *Y10T 428/2419* (2015.01); *Y10T 428/24215* (2015.01); *Y10T 428/24314* (2015.01); *Y10T 428/24777* (2015.01)

(58) Field of Classification Search
USPC ............ 361/627, 641, 644, 645, 657; 428/44, 428/192, 121, 124, 136
See application file for complete search history.

(56) References Cited

U.S. PATENT DOCUMENTS

| | | | | | |
|---|---|---|---|---|---|
| 2,354,919 | A | * | 8/1944 | Lockwood | 248/68.1 |
| 2,355,742 | A | * | 8/1944 | Morehouse | 248/68.1 |
| 2,396,836 | A | * | 3/1946 | Ellinwood | 174/135 |
| 2,404,531 | A | * | 7/1946 | Robertson | 248/68.1 |
| 2,563,441 | A | * | 8/1951 | Wood et al. | 361/606 |
| 3,742,119 | A | * | 6/1973 | Newman | 174/656 |
| 4,644,095 | A | | 2/1987 | Bright et al. | |
| 4,775,121 | A | * | 10/1988 | Carty | 248/68.1 |
| 4,890,318 | A | * | 12/1989 | Crane et al. | 379/413.02 |

(Continued)

FOREIGN PATENT DOCUMENTS

| | | |
|---|---|---|
| DE | 75336 | 8/1970 |
| DE | 2626343 A1 | 12/1977 |

(Continued)

OTHER PUBLICATIONS

European Search Report dated Aug. 29, 2013.

(Continued)

*Primary Examiner* — Anatoly Vortman
(74) *Attorney, Agent, or Firm* — Harness, Dickey & Pierce, P.L.C.

(57) ABSTRACT

Described is a metal sheet for a metal sheet assembly, in particular for a bottom plate of a distribution panel of an electrical switchgear. The metal sheet assembly includes at least one opening for conducting a cable therethrough. The metal sheet is provided with at least one cutout on the longitudinal side, wherein the metal sheet assembly is composed of at least two metal sheets and the two metal sheets abut along the longitudinal side. The two metal sheets are oriented, relative to each other, in such a way that the cutouts in the two metal sheets are arranged opposite each other.

27 Claims, 5 Drawing Sheets

(56) References Cited

U.S. PATENT DOCUMENTS

| | | | | |
|---|---|---|---|---|
| 5,023,397 | A | * | 6/1991 | Tomes et al. .................... 174/50 |
| 5,245,131 | A | * | 9/1993 | Golden et al. ................ 174/652 |
| 5,990,420 | A | * | 11/1999 | Alexander .................... 174/135 |
| 6,002,088 | A | | 12/1999 | Ehmann |
| 6,211,465 | B1 | * | 4/2001 | Streit ........................... 174/653 |
| 6,407,331 | B1 | * | 6/2002 | Smith et al. .................... 174/50 |
| 7,288,730 | B2 | * | 10/2007 | Habel et al. .................. 174/650 |
| 7,371,969 | B2 | * | 5/2008 | Hedstrom .................... 174/151 |
| 7,711,234 | B2 | * | 5/2010 | Smith et al. ................... 385/135 |
| 7,806,374 | B1 | * | 10/2010 | Ehmann et al. .............. 248/67.5 |
| 7,974,078 | B2 | * | 7/2011 | Coomer et al. ............... 361/678 |
| 8,616,506 | B2 | * | 12/2013 | Milton ......................... 248/74.1 |
| 2004/0130858 | A1 | * | 7/2004 | Lammers ...................... 361/605 |
| 2009/0218451 | A1 | * | 9/2009 | Lundborg ...................... 248/56 |
| 2010/0148018 | A1 | * | 6/2010 | Schoenau et al. ............ 248/74.4 |

FOREIGN PATENT DOCUMENTS

| | | |
|---|---|---|
| DE | 7816729 U1 | 9/1978 |
| DE | 8127366 | 9/1981 |
| DE | 3326551 A1 | 2/1985 |
| DE | 4421588 A1 | 2/1996 |
| DE | 29812944 U1 | 12/1999 |
| DE | 102004058346 A1 | 6/2006 |
| DE | 102007014786 A1 | 12/2008 |
| DE | 102008012460 B3 | 10/2009 |
| WO | WO-2011045044 A2 | 4/2011 |

OTHER PUBLICATIONS

English translation of German Office Action dated Nov. 11, 2011 for German Application No. 10 2011 004 426.4.

German Office Action for German Application No. 10 2011 004 426.4 (Not Yet Published), 2011.

* cited by examiner

ELECTRICAL SWITCHGEAR, IN PARTICULAR MEDIUM VOLTAGE SWITCHGEAR

PRIORITY STATEMENT

The present application hereby claims priority under 35 U.S.C. §119 to German patent application number DE 10 2011 004 426.4 filed Feb. 18, 2011, the entire contents of which are hereby incorporated herein by reference.

FIELD

At least one embodiment of the invention generally relates to an electrical switchgear, to a metal sheet assembly for a distribution panel of an electrical switchgear, and/or to a metal sheet for a metal sheet assembly of this type.

BACKGROUND

An electrical switchgear, in particular a medium voltage switchgear, generally includes a plurality of distribution panels. These panels can be feed-in panels, by which electrical power is supplied to the switchgear, or they can be output panels for distributing the electrical power to the consumers.

Electrical power is normally fed into the distribution panels by way of cables which are run inside ducts in the floor below the distribution panels. The cables extend from below into the distribution panels.

On the inside, the distribution panels are normally divided into different bays or compartments which are separated by metal plates. To insert the cables into one of the bays or into one of the compartments, these cables must extend through a metal plate, for example by conducting the cables from a cable duct through a bottom plate and into the respective distribution panel, wherein the metal plate or the bottom plate is normally provided with openings for this.

These openings must be formed, for example, into the respective metal plate and/or the bottom plate by stamping them out, based on the number of cables to be conducted through the plate and the desired spacing between these cables. The metal plate and/or the bottom plate must furthermore be cut out so as to correspond to the dimensions of the distribution panel. For that reason, the steel plate and/or the bottom plates must always be produced individually and depending on the respective use, wherein this involves expenditure.

SUMMARY

In at least one embodiment of the present invention, the design and/or the production of the steel plate and/or the bottom plate is simplified.

At least one embodiment of the invention is directed to an electrical switchgear, at least one embodiment is directed to a metal sheet assembly for a distribution panel used with an electrical switchgear, and at least one embodiment is directed to a panel for a metal sheet assembly.

The panel according to at least one embodiment of the invention is intended for a metal sheet assembly, in particular for a bottom plate of a distribution panel used in an electrical switchgear. The metal sheet assembly according to at least one embodiment of the invention is provided with at least one opening for conducting a cable therethrough. The metal sheet is provided with at least one cutout on one longitudinal side, wherein the metal sheet assembly is configured with at least two metal sheets. The two metal sheets abut along the longitudinal side and are oriented, relative to each other, in such a way that the cutouts in the two metal sheets are arranged opposite each other.

The metal sheet assembly can thus be produced using two metal sheets as defined for at least one embodiment of the invention, wherein the opening in the metal sheet assembly is formed by the two opposite-arranged cutouts. As a result of at least one embodiment of the invention, it is thus no longer necessary to stamp out the desired opening in the metal sheet assembly for each distribution panel. Instead, with the metal sheets according to at least one embodiment of the invention, the metal sheet assembly can be assembled and thus produced to match nearly any desired individual design option. The expenditure for and the production of the metal sheet assembly are consequently simplified considerably.

According to one modified version of at least one embodiment of the invention, the metal sheet assembly is composed of at least four metal sheets, wherein two metal sheets overlap each other, and wherein the dimensions of the metal sheet assembly can be specified in accordance with an amount of overlap of the two metal sheets.

The overlapping thus makes it possible to adapt the metal sheet assembly without further expenditure to the dimensions of the respective distribution panel. In this way, the metal sheet assembly can also be adapted without additional expenditure to the individual dimensions of any distribution panel.

According to one embodiment of the invention, the metal sheet is provided with a fold along the longitudinal side, wherein this fold is bent over by approximately 180 degrees. If two metal sheets are arranged overlapping, this fold nevertheless makes it possible for the metal sheets to be positioned on a rail or bar or the like.

The metal sheet according to another embodiment of the invention is provided with at least one elongated hole which extends transverse to the longitudinal side of the metal sheet. With the aid of these elongated holes, for example, two metal sheets which are arranged overlapping can be screwed to the aforementioned bar.

The metal sheet assembly of a different modification of the invention can be expanded with the aid of respectively two additional metal sheets which overlap each other. The metal sheet assembly thus can be adapted to the number of openings desired for cables to be conducted through, simply by using additional metal sheets according to at least one embodiment of the invention.

At least one embodiment of the invention consequently provides a metal sheet that allows a flexible configuring of a metal sheet assembly, in particular a bottom plate used for a distribution panel of an electrical switchgear, wherein the metal sheet assembly can be expanded modularly with the aid of this metal sheet. In this way, the metal sheet assembly can be adapted to the desired number of openings. The metal sheet assembly can furthermore be adapted to the dimensions of the distribution panel through the overlapping of the metal sheets.

BRIEF DESCRIPTION OF THE DRAWINGS

Additional features, options for use and advantages of the invention follow from the description below of example embodiments of the invention which are shown in the Figures. All therein described or illustrated features by themselves or in any combination represent the subject matter of the invention, regardless of how they are combined in the patent claims or their references back as well as their formulation and/or representation in the description or in the Figures.

FIG. 2 contains a schematic perspective view of two metal sheets as disclosed in FIG. 1, showing the example of a cable that is conducted through.

FIGS. 4A, 4B show a schematic view from above and a schematic sectional representation of the two metal sheets according to FIG. 2, provided with a rubber ring for the cable that is conducted through.

DETAILED DESCRIPTION OF THE EXAMPLE EMBODIMENTS

Figure 1:
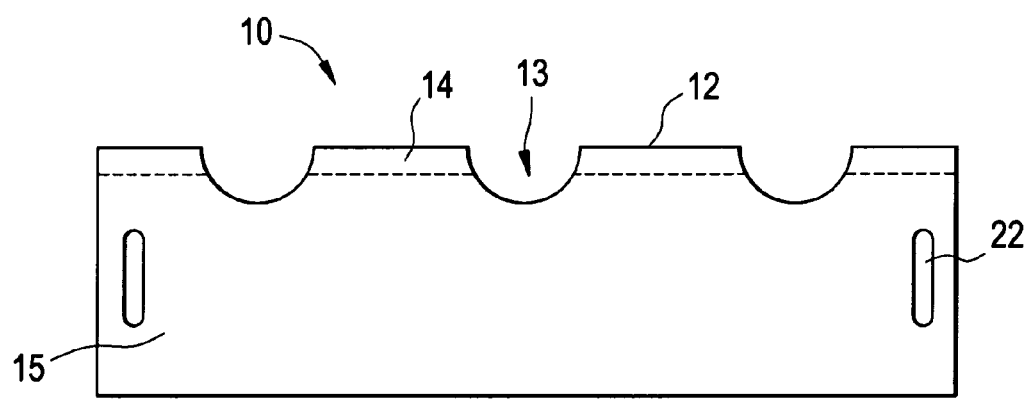
FIG. 1 shows a schematic view from above of an example embodiment of a metal sheet as disclosed for the invention, which is used to form a bottom plate of an electrical switchgear.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of examples in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

An electrical switchgear, in particular a medium voltage switchgear, is normally composed of a plurality of distribution panels, wherein these can be feed-in panels for supplying electrical power to the switchgear, or output panels for distributing the fed-in electrical power to the consumers. The distribution panels in this case are electrically connected via bus bars. Depending on their use, the individual distribution panels contain different electrical components, for example circuit breakers, disconnecting/grounding switches and the like.

Cables are generally used as supply lines to the distribution panels, wherein these cables are run inside a cable duct in the floor below the distribution panels. The cables are inserted from below into the distribution panels and, once inside a distribution panel, first reach a cable outlet compartment. The transition from the cable duct to the cable outlet compartment of the distribution panel is formed by an approximately horizontally oriented bottom plate containing openings through which the cables are inserted in an approximately vertical direction.

FIG. 1 shows a metal sheet 10 which can be used, in particular, to form the aforementioned bottom plate. It is understood that the metal sheet 10 can in general also be used to produce any type of metal sheet assembly for the distribution panel.

The metal sheet 10 has a rectangular shape and is provided with three approximately semi-circular cutouts 13 on one longitudinal side 12. The cutouts 13 are spaced apart approximately uniformly and are arranged essentially symmetrical along the longitudinal side 12, wherein it is understood that a different number of cutouts 13 can also be provided.

The longitudinal side 12 of the metal sheet 10 contains a fold 14 that is bent over by approximately 180°. In FIG. 1, this fold 14 is bent downward and is therefore only indicated as a dashed line. The width of the fold 14 transverse to the longitudinal direction 12 can also be greater or smaller than is shown in FIG. 1. In the region of the cutouts 13, the fold 14 is cut out as well, so that the fold 14 does not project into the region of the cutouts 13.

The large surface area of the metal sheet 10 which does not belong to the fold 14 is in the following referred to as the cover surface 15.

Figure 2:
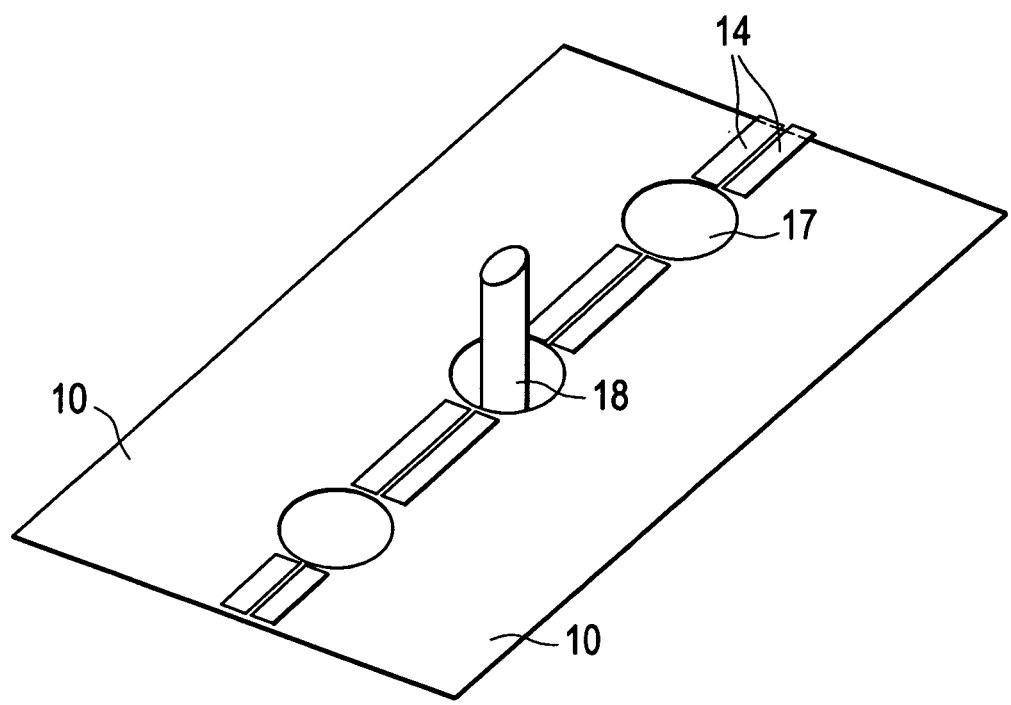

FIG. 2 shows two metal sheets 10 which abut along the longitudinal sides 12. Both metal sheets 10 in FIG. 2 are identical to the metal sheet 10 in FIG. 1. The two metal sheets 10 are oriented relative to each other in such a way that the respective cutouts 13 in the two metal sheets 10 are arranged opposite each other. As a result, three approximately circular openings 17 are formed by the cutouts 13 in the two metal sheets 10, wherein these openings 17 are assigned to a row of cables. For example, one cable 18 is conducted through one of the openings 17.

As previously explained, the two metal sheets 10 abut along the longitudinal sides 12. The two folds 14 of the two metal sheets 10 thus extend substantially parallel to each other while the ends of the two folds 14 point in opposite directions. FIG. 2 shows that the two folds 14 of the two metal sheets 10 are respectively bent upward. The two metal sheets 10 are thus arranged in such a way that the two adjacent folds 14 are bent over in the same direction.

It is understood that one of the two metal sheets 10 in FIG. 2 can also be arranged "reversed," so that the two folds 14 in the two metal sheets 10 are bent over in different directions.

Figure 3A:
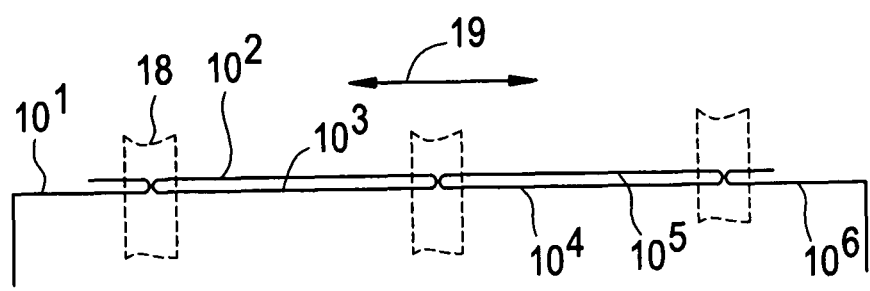
FIGS. 3A, 3B, 3C, and 3D show schematic views from the side of several metal sheets as disclosed in FIG. 1, respectively with different spacing between the cables conducted through, as well as with a different number of cable rows.

A total of six metal sheets 10 are provided in FIG. 3A which jointly form a bottom plate for a distribution panel. Apart from the two edge metal sheets, each of the six metal sheets 10 in FIG. 3A coincides with the metal sheet 10 in FIG. 1. The six metal sheets 10 are arranged side-by-side in an essentially approximately horizontal plane. The four metal sheets 10 between the two edge metal sheets are "reversed" as compared to each other and are therefore arranged overlapping.

The six metal sheets 10 thus provide three cable rows with respectively three openings 17. In each of the three cable rows, a single cable 18 is indicated which is conducted through one of the openings 17.

According to FIG. 3A, the individual metal sheets 10 differ by successive superscript numbers. A double arrow 19 furthermore used to mark the extension of the metal sheets 10 in the direction of the approximately horizontal plane, formed by these metal sheets.

The metal sheet $10^1$ is an edge metal sheet and is therefore bent over by approximately 90°, wherein this bent region can be used to attach the metal sheet $10^1$, for example, to a vertical housing wall for the associated distribution panel. It is understood that the metal sheet $10^1$ can also be bent upward. With the metal sheet $10^1$ the fold 14 is bent upward so that the cover surface 15 of the metal sheet $10^1$ is arranged below the fold 14.

The fold 14 of the metal sheet $10^2$ abuts the fold 14 of the metal sheet $10^1$. The fold 14 of the metal sheet $10^2$ is bent downward. The fold 14 of the metal sheet $10^1$ and the cover surface 15 of the metal sheet $10^2$ are essentially arranged in a joint plane.

The metal sheet $10^3$ is arranged overlapping with the metal sheet $10^2$. For that purpose, the cover surface 15 of the metal sheet $10^3$ is arranged below the cover surface 15 of the metal sheet $10^2$ and the fold 14 of the metal sheet $10^3$ is bent upward, thus pointing in the opposite direction as compared to the fold 14 of the metal sheet $10^2$. The cover surface 15 of the metal sheet $10^2$ and the fold 14 of the metal sheet $10^3$ are essentially arranged in a joint plane. The same is true for the fold 14 of the metal sheet $10^2$ and the cover surface 15 of the metal sheet $10^3$.

The fold 14 of the metal sheet $10^4$ abuts the fold 14 of the metal sheet $10^3$. The fold 14 of the metal sheet $10^4$ is bent upward in the same way as the fold 14 of the metal sheet $10^3$. The cover surface 15 of the metal sheet $10^4$ and the cover surface 15 of the metal sheets $10^3$ are essentially arranged in a joint plane.

The same is also true for the fold 14 of the metal sheet $10^4$ and the fold 14 of the metal sheet $10^3$.

The metal sheet $10^5$ is arranged overlapping with the metal sheet $10^4$. For that purpose, the cover surface 15 of the metal sheet $10^4$ is arranged below the cover surface 15 of the metal sheet $10^5$ and the fold 14 of the metal sheet $10^5$ is bent downward and thus points in the opposite direction as compared to the fold 14 of the metal sheet $10^4$. The cover surface 15 of the metal sheet $10^5$ and the fold 14 of the metal sheet $10^4$ are essentially arranged in a joint plane. The same is true for the fold 14 of the metal sheet $10^5$ and the cover surface 15 of the metal sheet $10^4$.

The fold 14 of the metal sheet $10^5$ is arranged opposite the fold 14 of the metal sheet $10^6$. The metal sheet $10^6$ represents an edge region and is embodied and arranged in the same way as the metal sheet $10^1$.

The overlapping metal sheets $10^2$, $10^3$ and the overlapping metal sheets $10^4$, $10^5$ are arranged, relative to each other, in such a way that they respectively overlap completely. It means that the fold 14 and the cover surface 15 of the respectively overlapping metal sheets $10^2$, $10^3$, $10^4$, $10^5$ nearly abut, meaning there is essentially no distance between them. As a result, all six metal sheets taken together $10^1$, $10^2$, $10^3$, $10^4$, $10^5$ and $10^6$ have a minimum expansion in the direction of the double arrow 19.

Figure 3B:
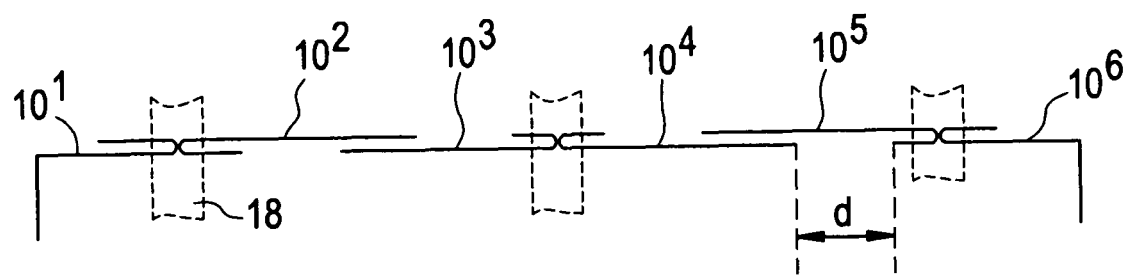

FIG. 3B shows the same six metal sheets 10', $10^2$, $10^3$, $10^4$, $10^5$ and $10^6$ which are also shown as in FIG. 3A. The metal sheets $10^1$, $10^2$, $10^3$, $10^4$, $10^5$ and $10^6$ together form a bottom plate for a distribution panel. The metal sheets $10^1$, $10^2$, $10^3$, $10^4$, $10^5$ and $10^6$ are embodied identical and are basically also arranged in the same way as in FIG. 3A and as explained in the above.

In contrast to FIG. 3A, in FIG. 3B the overlapping metal sheets $10^2$, $10^3$ and the overlapping metal sheets $10^4$ and $10^5$ are arranged, relative to each other, in such a way that they do not completely overlap. It means that the fold 14 and the cover surface 15 of the respectively overlapping metal sheets $10^2$, $10^3$, $10^4$, $10^5$ do not abut each other. Instead, they are spaced apart by a distance d, wherein the distance d in this case can be adjusted nearly optionally. Owing to the distance d, all six metal sheets 10', $10^2$, $10^3$, $10^4$, $10^5$ and $10^6$ in FIG. 3B taken together cover a larger area in the direction of the double arrow 19 than the six metal sheets 10', $10^2$, $10^3$, $10^4$, $10^5$ and $10^6$ in FIG. 3A.

As can be seen in FIGS. 3A, 3B, the area covered by the metal sheets 10 in the direction of the arrow 19 depends on the spacing d between the metal sheets and thus the scope of the overlapping. The smaller the overlapping of the metal sheets 10, the greater the spacing d and thus the area covered by the metal sheets 10 in the direction of the arrow 19.

As previously explained, a total of six metal sheets are shown in FIGS. 3A, 3B which jointly form a bottom plate provided with three cable rows through which respectively one cable 18 is conducted.

Figure 3C:
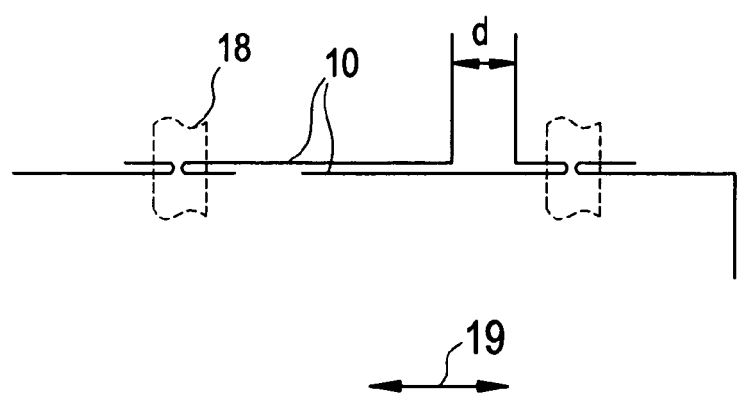

FIG. 3C shows four metal sheets 10 which are embodied identical and basically are also arranged in the same way as those in FIGS. 3A, 3B. The four metal sheets 10 form a bottom plate for a distribution panel. Two cable rows with respectively three openings 17 are thus made available as a result of the four metal sheets 10, wherein the cables 18 can be conducted through these openings 17.

FIG. 3C shows an example of the overlapping of metal sheets 10, such that the resulting spacing d is smaller in FIG. 3C than in FIG. 3B.

Figure 3D:
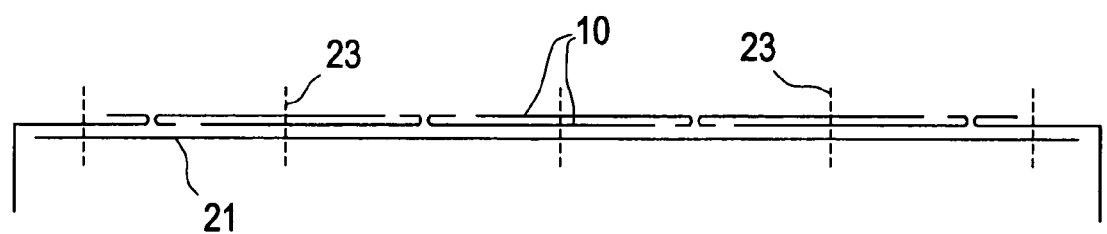

FIG. 3D shows eight metal sheets 10 which are embodied identical and in principle are also arranged in the same way as shown in FIGS. 3A, 3B. The eight metal sheets 10 form a bottom plate for a distribution panel. As a result of the eight metal sheets 10, four cable rows with respectively three openings 17 are thus made available, wherein the cables 18 can be conducted through these openings 17.

As follows in particular from FIGS. 3C, 3D, the number of cable rows formed by the metal sheets 10 can be changed, wherein respectively two additional, overlapping metal sheets 10 are required for obtaining additional cable rows.

On the one hand, the area covered by the metal sheets 10 and thus the bottom plate for the distribution panel can be adjusted in the direction of the arrow 19 through a corresponding change in the overlapping of the metal sheets 10. On the other hand, the number of cable rows in the bottom plate can also be adjusted by using a corresponding number of metal sheets 10. The bottom plate formed with the metal sheets 10 can thus be adapted to the dimensions and the number of the cables required for the respective distribution panel.

A bar 21 is shown schematically in FIG. 3D which extends below the metal sheets 10 in the direction of the arrow 19, wherein this bar 21, for example, can be attached to a vertical housing wall of the associated distribution panel. A corresponding bar can also be attached to the opposite housing wall.

The metal sheets 10 thus rest either with their cover surface 15 or with their folds 14 on the bar(s) 21. Owing to the identical embodiment of the metal sheets 10, as well as the above described arrangement of the metal sheets 10, all metal sheets 10 essentially rest flat and with the complete surface on the bar(s) 21.

As shown with the example in FIG. 1, the metal sheets 10 can be provided with elongated holes 22 which extend transverse to the longitudinal side 12 of the metal sheets 10. The elongated holes 22 in this case are embodied and arranged in such a way and the overlapping of the two metal sheets 10 is such that with two overlapping metal sheets 10, respectively one screw can be fitted through the elongated holes 22 in the two metal sheets 10.

Correspondingly assigned bore holes can be provided in the bar(s) 21 through which the screws can be inserted, thus making it possible to screw the metal sheets 10 to the bar(s) 21. In FIG. 3D, these screw connections are shown schematically with the aid of the dashed lines 23, which are intended to represent the individual screws.

Figure 4A:
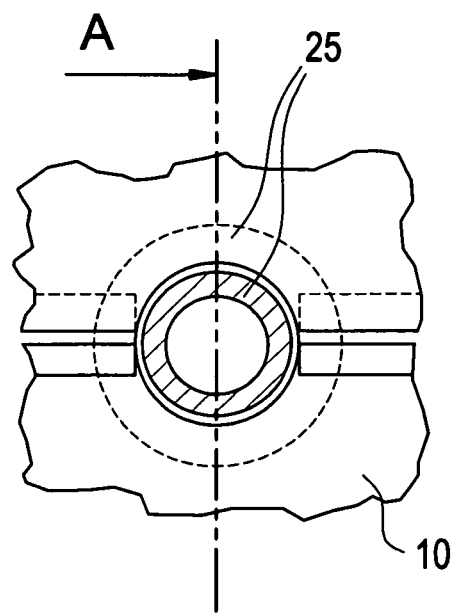
Figure 4B:
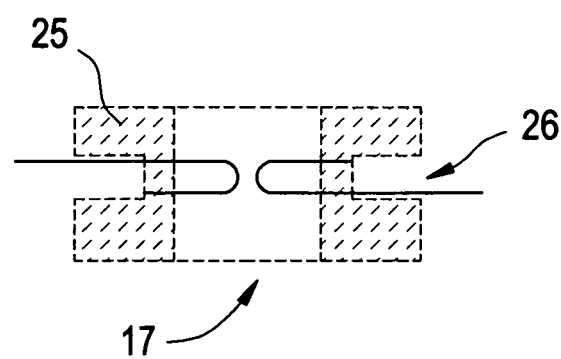

The region containing the opening 17 that is formed by two metal sheets 10 which abut is shown in FIGS. 4A, 4B. FIG. 4B in this case is a sectional view along the plane A in FIG. 4A. A rubber ring 25 is fitted inside the opening 17. It is understood that the rubber ring 25 can also be a ring produced of plastic or any other comparable material.

The rubber ring 25 has a C-shaped cross section, wherein the outer circumference contains an offset 26 for the approximately semi-circular cutouts 13 in the two metal sheets 10. The rubber ring 25 rests essentially flat on the cover surfaces 15 and the folds 14 of the two metal sheets 10. During the assembly of the metal sheets 10 within the distribution panel, the rubber ring 25 can be inserted into the respective cutouts 13 of the two metal sheets 10. Following that, the respective cable 18 can then be inserted through the rubber ring 25 and thus also the opening 17.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An electrical switchgear, comprising:
    a distribution panel with a metal sheet assembly, the metal sheet assembly including
        at least one opening for a cable; and
        at least four metal sheets, wherein
            each of the at least four metal sheets comprises at least one cutout on one longitudinal side,
            each of the at least four metal sheets comprises a cover surface on a far side of the longitudinal side,
            two of the at least four metal sheets abut along the longitudinal side and are oriented, relative to each other, in such a way that the at least one cutout in the two metal sheets are arranged opposite each other to form the opening, two of the at least four metal sheets overlap each other with their cover surfaces, and a dimension of the metal sheet assembly being adjustable based on an amount of overlap of the cover surfaces of the two metal sheets.

2. A metal sheet assembly of a distribution panel of an electrical switchgear, the metal sheet assembly comprising:
at least one opening for a cable; and
at least four metal sheets, wherein
each of the four metal sheets comprises at least one cutout on one longitudinal side,
each of the four metal sheets comprises a cover surface on a far side of the longitudinal side,
two of the at least four metal sheets abut along the longitudinal side and are oriented, relative to each other, in such a way that the at least one cutout in the two metal sheets are arranged opposite each other to form the opening,
two of the at least four metal sheets overlap each other with their cover surfaces, and
a dimension of the metal sheet assembly being adjustable based on an amount of overlap of the cover surfaces of the two metal sheets.

3. The electrical switchgear according to claim 1, wherein the metal sheet is provided along the longitudinal side with a fold.

4. The electrical switchgear according to claim 3, wherein the fold is bent over by approximately 180 degrees.

5. The electrical switchgear according to claim 1, wherein the metal sheet is approximately rectangular.

6. The electrical switchgear according to claim 1, wherein the cutout is approximately semi-circular.

7. The electrical switchgear according to claim 1, wherein the metal sheet includes three cutouts.

8. The electrical switchgear according to claim 7, wherein a spacing between the cutouts is approximately the same.

9. The electrical switchgear according to claim 1, wherein the metal sheet includes at least one elongated hole which extends transverse to the longitudinal side of the metal sheet.

10. The electrical switchgear according to claim 1, wherein the metal sheet assembly is expandable with the aid of two additional metal sheets that overlap each other.

11. The electrical switchgear as claimed in claim 1, wherein the electrical switchgear is a medium voltage switchgear.

12. The electrical switchgear as claimed in claim 1, wherein the metal sheet assembly is a bottom plate of the distribution panel and includes the at least one opening for a cable.

13. The metal sheet assembly as claimed in claim 2, wherein the metal sheet assembly is a bottom plate of the distribution panel for the electrical switchgear.

14. The metal sheet assembly according to claim 2, wherein the metal sheet is provided along the longitudinal side with a fold.

15. The metal sheet assembly according to claim 14, wherein the fold is bent over by approximately 180 degrees.

16. The metal sheet assembly according to claim 2, wherein the metal sheet is approximately rectangular.

17. The metal sheet assembly according to claim 2, wherein the cutout is approximately semi-circular.

18. The metal sheet assembly according to claim 2, wherein the metal sheet includes three cutouts.

19. The metal sheet assembly according to claim 18, wherein a spacing between the cutouts is approximately the same.

20. The metal sheet assembly according to claim 2, wherein the metal sheet includes at least one elongated hole which extends transverse to the longitudinal side of the metal sheet.

21. The metal sheet assembly according to claim 2, wherein the metal sheet assembly is expandable with the aid of two additional metal sheets that overlap each other.

22. The electrical switchgear according to claim 1, wherein the longitudinal sides of the at least four metal sheets abut in a non-overlapping manner.

23. The metal sheet assembly as claimed in claim 2, wherein the longitudinal sides of the at least four metal sheets abut in a non-overlapping manner.

24. The electrical switchgear according to claim 1, wherein the at least four metal sheets are identical.

25. The metal sheet assembly as claimed in claim 2, wherein the at least four metal sheets are identical.

26. The electrical switchgear according to claim 1, wherein the at least four metal sheets are arranged on a plane.

27. The metal sheet assembly as claimed in claim 2, wherein the at least four metal sheets are arranged on a plane.

* * * * *